Jan. 17, 1939. P. P. HORNI 2,144,535
ELECTRICAL DETECTION APPARATUS
Filed June 13, 1934 4 Sheets-Sheet 1

INVENTOR
Paul P. Horni
BY
ATTORNEYS.

Patented Jan. 17, 1939

2,144,535

UNITED STATES PATENT OFFICE 2,144,535

ELECTRICAL DETECTION APPARATUS

Paul Peter Horni, Newark, N. J.

Application June 13, 1934, Serial No. 730,388

16 Claims. (Cl. 177—337)

This invention relates to apparatus for electrically detecting the presence of bodies, and has particular reference to apparatus actuated magnetically, or inductively, or both, by a body or a magnetic field, as compared to apparatus which detects the presence of the body by mechanical contact therewith.

Magnetic and inductive detection has been applied with some measure of success in the train control art, and that has been largely due to the fact that the larger metal masses of trains, including the locomotive and other parts of the rolling stock, are easily detected magnetically, but when it is desired to apply that principle to the detection of smaller bodies, or bodies containing a small amount of detectable material, or bodies at a distance from the detector, such as road vehicles, elevators, vessels, magnetic-flux-emanating bodies, ore or remote metal bodies and deposits, and the like, a greater degree of sensitivity is necessary for the detector in order that it will respond to the body or other subject, the presence of which is to be detected. However, this greater degree of sensitivity in the detector also has the objection that the detector is readily affected or disturbed by extraneous disturbances having no connection with the body or subject to be detected, and by way of example, a detector mounted in a road bed, which is sufficiently sensitive to detect the presence of all sorts of rapidly moving traffic, is likely to be affected by the presence of metal near by, including water, gas, and sewer pipes, reenforcing metal in a concrete street, and the like, as well as disturbances due to surges in adjacent power lines, and the like.

I have provided a detector system which is sufficiently sensitive to respond to bodies of relatively small masses without having disproportionately large sensitive areas, and at the same time an arrangement of the detector system in such a way that it is not affected by extraneous disturbances, which, from a practical viewpoint, comprehends a uniform, interchangeable detector device which can be mounted anywhere without individual adjustment to compensate for local conditions. My detector system is particularly adapted to the detection of moving bodies, such as rapidly moving vehicles, magnetic bodies, elevators, vessels, and the like, and in order to illustrate the application of my invention it will be described in connection with the detection of vehicular traffic, although it is to be understood that the invention is not limited to this use, but has a wide application in many other arts. Also, my detector is impervious to deterioration due to moisture, shocks, electrical disturbances, and the like.

In accordance with my invention, a control apparatus is provided having a detector system which meets all requirements of sensitivity without being susceptible to extraneous disturbances, provides positive response to the presence of bodies and other subjects, is immune to deterioration, moisture, and the like, and has all the advantages of interchangeability and installation facility.

My invention includes a detector unit adapted to be mounted in proximity to the path of an advancing body, magnetic field, or both, and comprises a transformer element encased in a unitary enclosure and having two elongated laminated open cores arranged substantially parallel, with two primary windings on diagonally opposite poles and two secondary windings in the remaining diagonal positions, so that when alternating current is passed through the primary windings the resultant flux not only traverses each core and the air gap between the ends thereof, but also crosses the space between the adjacent primary and secondary coils of the two cores. The dispersion of the leakage flux of the transformer is restricted to a predetermined area adjacent the transformer windings by magnetic shielding means to procure the dispersion of the magnetic flux to predetermined directions and not to areas not intended to be sensitized. This shielding means also substantially prevents the transformer element from being affected by an extraneous magnetic or inductive body, magnetic field, railroad rails, or water, gas, and sewer pipes, and the like. The primary purpose of the shield, however, is not to entirely confine the magnetic field emanating from the detector, but to concentrate the flux in the space above the detector through which vehicles on the roadway will pass, whereby the detector will be more sensitive.

It is well known that any conducting material placed in close proximity to the magnetic circuit of a detector of the class described will have eddy currents induced therein, this effect being more pronounced as the frequency of the exciting current for the detector is increased. It is a common experience to install a detector pad and thereafter note that its operation is other than that which was originally intended, the variance in operating characteristics being due solely to a body or bodies of conducting material hidden beneath the road surface. The inclusion of shielding means in the apparatus of the present invention obviates this condition and prevents a change of the operating characteristics of a detector installed under given conditions, regardless of the presence of bodies otherwise capable of causing a marked disturbance in the operating characteristics of the detector.

The unitary enclosure of the detector transformer element is preferably monolithic, such as concrete, which encases the windings, leads and cores and all insulating material, permanently locks them in proper adjusted positions, and protects them from injury due to shocks, moisture, and deterioration. Also, the coils and conductors are encased by a novel non-capillary active covering. The long, narrow, monolithic detector units so formed are accordingly self-shielded and uniform, and detect the presence or passage of a magnetic or inductive body or magnetic field intercepting the leakage flux from the primary windings, which results in variation of the normal current induced in the secondary windings to disturb the normal balance of an electrical circuit.

The detector circuit includes the aforementioned circuit across the terminals of which are connected the series-connected secondary windings of the detector unit and a sensitive detector relay, which, upon any variation of the electrical characteristics in the secondary circuit, closes the circuit of a control relay in the circuit of any form of regulating or signalling system, such as switching devices for alternately energizing traffic lights, or the like, at a street or road intersection to signal the right of way.

In order to provide a large sensitive area such as across a wide road, in a long elevator shaft, on a ship pier, or the like, as many of the detector units as are necessary can be placed adjacent to each other to suit requirements as to the size and shape of the sensitized area. It has been found that by connecting the primary windings of the detectors in parallel and the secondary windings in series, great efficiency is obtained without sacrifice of sensitivity and without requiring more than one detector relay for each detector set. With the secondary winding of two detectors connected in series the sensitivity of the sensitive area is double that of the sensitive area of one detector, and for three detectors so connected the sensitivity is tripled. This is largely made possible by a novel arrangement of balancing the resistance and capacitance of the individual detector unit circuit. Also, a novel bypass around the memory relay is provided to allow sufficient leakage to prevent freezing of the contacts of the detector relay, which accordingly can be made extremely sensitive and accurate.

It will be seen that with the present invention, magnetic and inductive detecting systems become a practical possibility, all of the objections thereto being eliminated, so that advantage can be taken of the many favorable features of this type of detector system as compared to the mechanically actuated type of detector.

For a more complete understanding of the invention, reference may be had to the accompanying drawings, in which, in order to clearly illustrate my invention, I have shown an adaptation to traffic control.

Figure 1:
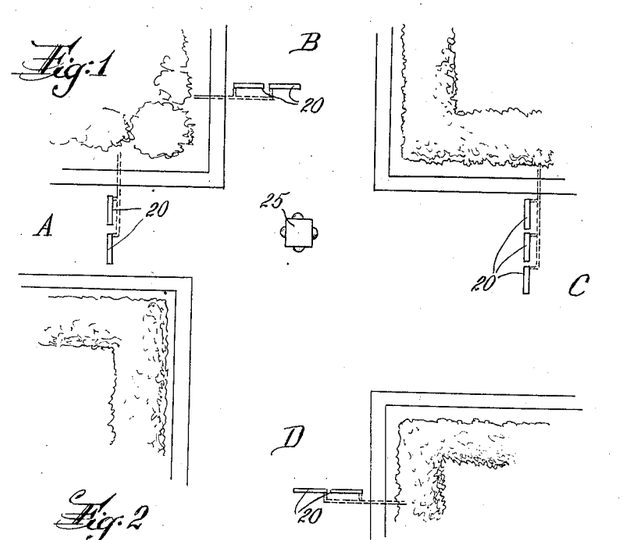
Figure 1 illustrates a street or road intersection with a typical street arrangement of the detector units of this invention.

Referring to Figure 1 of the drawings, showing the application of the new detecting system to traffic control, numeral 20 designates the detector unit which is laid lengthwise across the street or road at the detection point and in the manner indicated, i. e., in the path and transversely of the direction of movement of vehicular traffic approaching the intersection of the streets or roads, A, B, C and D. Also, as many of the detector units of uniform size as are necessary may be laid lengthwise end-to-end in a line across a street or road of considerable width, as is indicated in streets B, C and D, whereas in one-way streets, as in street A, the detector units extend all of the way across the street.

Figure 2:
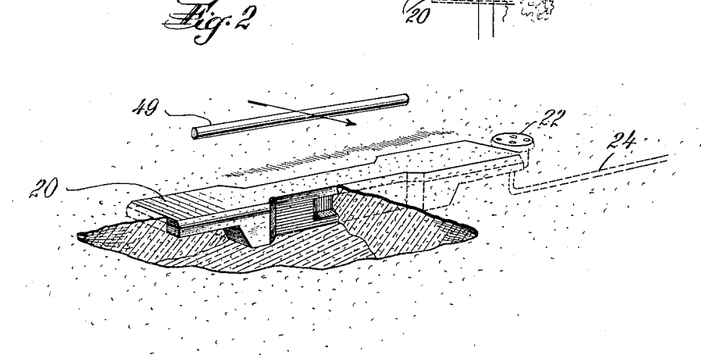
Figure 2 is a perspective view of one of the detector units mounted in a road bed.
Figure 3:
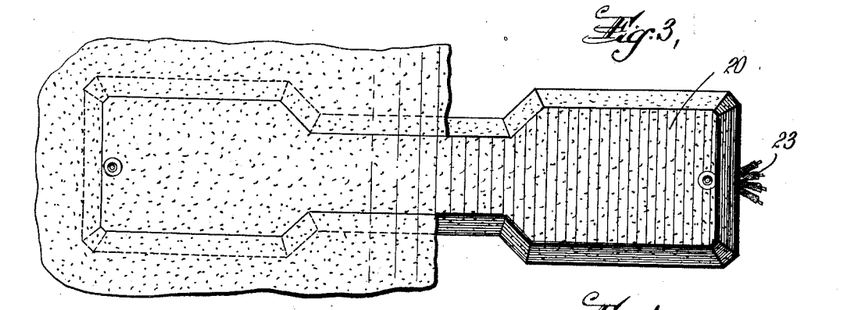
Figures 3, 4 and 5 are respective plan, side, and bottom views of one of the detector units.
Figure 4:
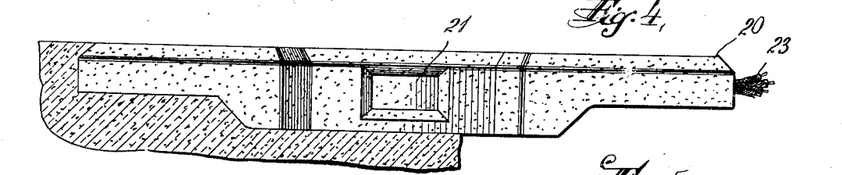
Figure 5:
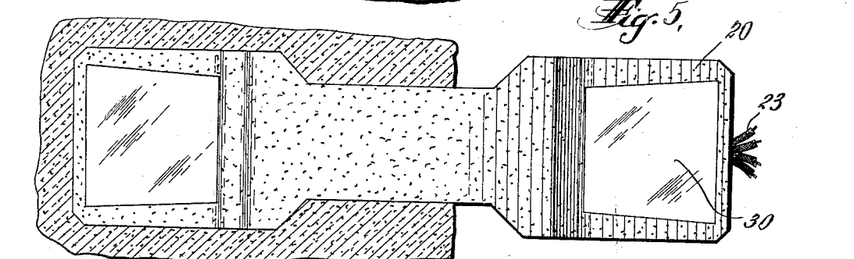

In external appearance the detector units 20 are monolithic blocks of concrete without other housing or enclosing means, as is illustrated in Figures 3, 4 and 5, and accordingly are settable flush in a concrete-surfaced road bed, or the like, without liability of subsequent settling or rising to impair the smooth surface of the road or street but, in fact, becoming bonded thereto so as to be part of it. The units are provided with key recesses 21, into which the concrete or the like of the road surfacing material is introduced when it is laid, so that the units 20 are securely locked in place without requiring other anchoring means. A connection box 22 (Figs. 2, 6 and 9) for housing the wires 23 completes the detector unit assembly during placement in the road bed, the wires 23 leading through a conduit 24 to the control box, or the like, for the traffic signal 25 located in the center of the intersection, or the like.

Figures 6, 7, 8, 9:
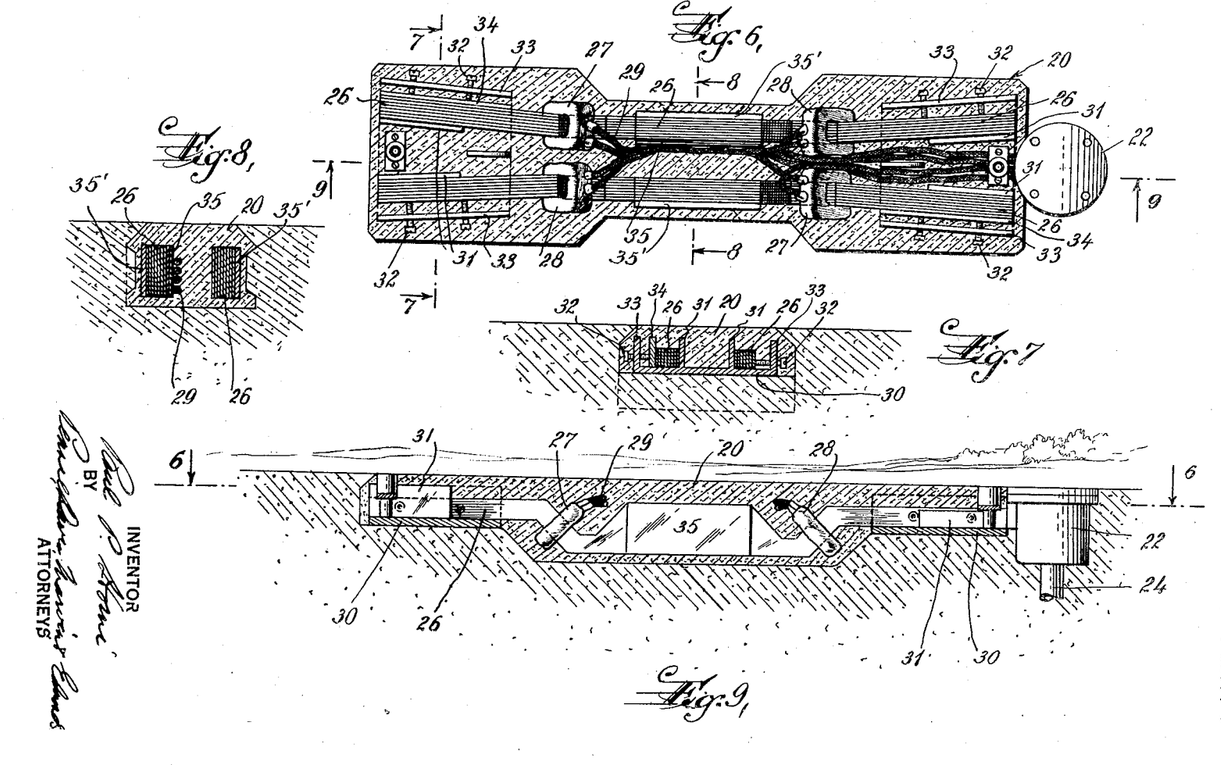
Figure 6 is a horizontal section through one of the detector units, as seen along the line 6—6 of Figure 9.
Figures 7 and 8 are transverse sections through one of the detector units as seen along the lines 7—7 and 8—8, respectively, of Figure 6.
Figure 9 is a vertical section through one of the detector units as seen along the line 9—9 of Figure 6.
Figure 10:
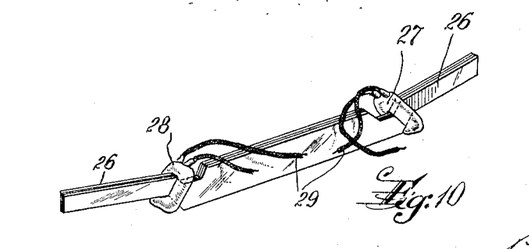
Figure 10 illustrates in perspective one of the transformers of a detector unit.

The detector unit 20 includes a transformer element comprising two separated but inductively coupled transformers, each having an elongated, laminated, open core 26 of magnetically permeable material, such as iron or steel, their alloys, or the like, which is shaped with upturned ends to shorten the upper air gap, as is illustrated in perspective in Figure 10 and in elevation in Figure 9. The cores 26 are arranged substantially parallel and each of them carries a primary winding or coil 27 and a secondary winding or coil 28 arranged in such a way that the primary and secondary coils of the two cores 26 are located adjacent each other, as is illustrated particularly in Figures 6, 9 and 11. Leads 29 for these primary and secondary windings extend into the connection box 22.

The primary and secondary windings 27 and 28 and their leads 29 are encased in a non-capillary active envelope built up in a novel manner on enameled wire with insulating material including an initial silk braid or fabric covering, a secondary linen or cotton braid or fabric, and a final dense rubber coating, each of the porous fabric layers being saturated with nitrocellulose lacquer before the next layer is applied and the final rubber coating immersed in the lacquer. The rubber coating is used to prevent mechanical injury to the nitrocellulose and the several layers of lacquer effectively close the pores of the silk, linen, and rubber layers, so that not only are the coils and their leads effectively protected and insulated, but all pores thereof are closed so as to prevent infiltration of moisture by capillary action or condensation by rapid change of temperature. Long and exhaustive tests have proven this coating to be absolutely moisture proof under all operating conditions, whereby uniform operation of the more vulnerable part of the detecting system is assured and replacements and repairs are thus eliminated.

Figures 11, 13:
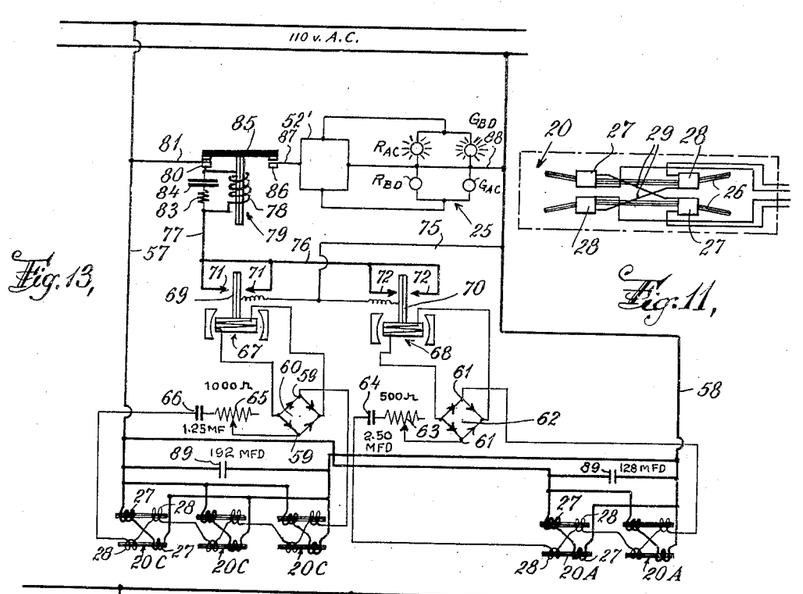
Figure 11 is a diagram of the electrical connections of a detector unit.
Figure 13 is a diagram of the electrical circuit of the multiple detector unit system arrangement of Figure 1.
Figure 12:
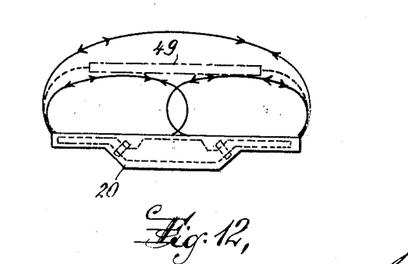
Figure 12 illustrates graphically the general flux paths of one of the detector units.

Impression of a suitable alternating current on the primary windings or coils 27 establishes an inductive coupling between the primary windings 27 and the corresponding secondary windings 28 on each core 26, the resultant magnetic flux flowing through the core 26 and across the air gap between the ends thereof, which are bent to shorten this air gap so as to induce the magnetic flux to flow in a predetermined direction, such as upward, as is indicated in Figure 12. The proximity of the two transformer cores 26 (Fig. 11) results in an inductive coupling between their primary and secondary windings, so that a transverse, roughly diagonal flow of flux takes place at the center of the transformer in addition to the general longitudinal or unilateral flow indicated in Figure 12.

The flow of the leakage flux is confined or restricted in a predetermined direction, such as upwardly, by shielding the ends of the transformer cores 26, as is illustrated in Figures 6 and 7. This shielding means comprises conductive material such as aluminum, copper, brass, or the like, arranged at the ends of the transformer cores 26 in the form of a plate 30 having upstanding ribs 31 and 33 which embrace the inner and outer surfaces of the transformer cores 26 near their ends. Set screws 32 are threaded through upstanding outer ribs 33 and the transformer cores 26 are thus clamped against the ribs 31, as indicated particularly in Figure 7. Interposed between set screw 32 and the primary end of each of the transformer cores 26 is an auxiliary shielding plate 34. The shielding 30, 31, 33 and 34, prevents the lateral and downward flow of the leakage flux from the corresponding ends of the transformer cores 26 and thus confines the flow of the flux in a substantially upward direction. The shielding 30, 31, 33 and 34 is made sufficiently thick to effectively shield the transformer cores in the manner described. The conductive metals noted act as shields in the manner well known in the electrical art. Thus when alternating magnetic flux from the transformer cores encounters the conductive shield metal, this flux sets up eddy currents in the metal of the shields and these eddy currents in turn induce a magnetic flux which opposes the passage of the flux from the transformer cores. In order to shield the center of the transformer core 26 which lies next adjacent the leads 29, a shield 35 is interposed between these leads and the center portions of the adjacent core 26, as is illustrated in Figures 6, 8 and 9. This shield 35 is made up of a layer of non-conductive, non-magnetic material adjacent the core 26 of the transformer and a thin layer of conductive material adjacent the leads 29 to prevent the magnetic flux of the leads 29 from unbalancing or otherwise disturbing the magnetic flux within the core 26.

It will be understood that the term "shielding" as applied herein to the function of the elements 30, 31, 33, 34 and 35, means the shielding of the flux emanating from the transformer cores against free passage in a direction other than upwardly through the surface of the road. In other words, the shielding does not entirely confine the magnetic field emanating from the detector, but merely concentrates or directs the field through the road surface where it will be most effective.

In cases where a detector unit 20 is placed between car tracks or large bodies of magnetic material, auxiliary shields 35' of conductive material are placed along the outside surfaces of the centers of the cores 26, as is illustrated in Figures 6 and 8.

The entire organization of the detector unit just described is assembled in a mold or form at some point remote from the place of use, the shield plate 30, with its upstanding ribs 31 and 33 and set screws 32, serving to hold the transformer cores 26 properly spaced with their primary and secondary windings 27 and 28 in the proper relationship. In this condition the initially plastic material, preferably concrete, is poured in the mold or form around the electrical elements of the detector unit, so that the monolithic structure 2C, previously described, is formed, which consists in effect of a transformer encased in a monolithic block without requiring the use of additional containers or housings containing liquid or plastic insulation as is usual with transformers.

Figure 14:
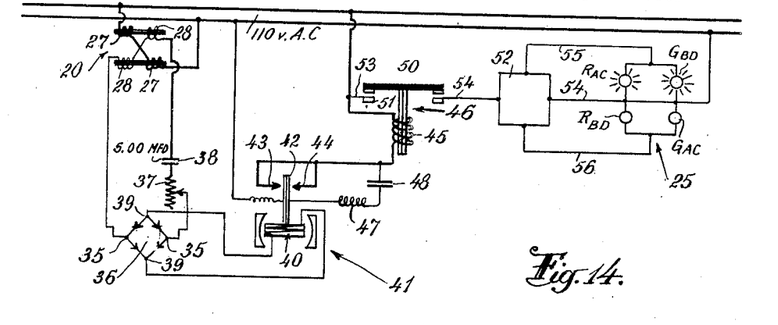
Figure 14 is a diagram of the electrical circuit of a single detector unit system.

The circuit for the detector unit is illustrated in Figures 13 and 14, the latter representing the circuit for one detector per street and the former the circuit for a plurality of detector units per street. In Figure 14, the primary windings or coils 27 of the detector unit 20 are shown connected in series across the terminals of a 110-volt A. C. lighting circuit, while the secondary windings 28 are connected in series across opposite terminals 35 of a Wheatstone bridge type of rectifier 36, through an adjustable resistance 37 of approximately 200 ohms and a condenser 38 of the order of 5 microfarads. The opposite or direct current poles 39 of the bridge-rectifier 36 are connected to the winding 40 of a polarized moving coil or galvanometer type detector relay 41 having a contactor 42 moving between two stationary contacts 43 and 44. Contacts 43 and 44 are connected through the winding 45 of control relay 46 to one side of the 110-volt line and the contactor 42 of the detector relay 41 is connected to the other side of the 110-volt line.

The circuit including the secondary windings 28 of the detector unit 20, normally supplies direct current at a predetermined value to the circuit of detector relay 41, so that the contactor 42 of detector relay 41 is normally held at a mid-point and disengaged from contacts 43 and 44. Movement of a magnetic or conductive body, a magnetic field, or a mass of permeable material, such as the axle 49 (Figs. 2 and 12) of an automobile for example, into the magnetic field of detector unit 20 decreases the coupling between the primary windings 27 and the secondary windings 28 of the detector unit to decrease the current in the secondary windings 28, so that the current in the detector relay coil 40 drops and the relay 41 moves to engage its contactor 42 with contact 43. The detector relay 41, being polarized, is arranged to respond either positively or negatively to close the circuit to control relay 46 whose coil draws armature 50 into engagement with contacts 51 to close a control circuit. Should the mass be of sufficient size, the relay current will pass through zero and the magnetic coupling of the detector will increase so that the current in the relay coil 49 rises and contact 44 will be engaged instead of 43. This arrangement accordingly has the advantage of alternative response to either increased or decreased magnetic coupling in the roadway detector. A choke coil 47 and a condenser 48 are connected in series across the relay gap to suppress sparking at the contacts.

By way of illustration, this control circuit may be arranged to control a traffic signal system of the type including a motor switching device 52 of the commutator type connected through contacts 51 of the control relay 46 by wire 53 to one side of the 110-volt line and by wire 54 to the other side of the supply line. This switching device 52 is arranged in a conventional way to energize the traffic lights or other signals 25 (Fig. 1) having a red or "stop" light and a green or "go" light for each street with optional amber or warning lights which are energized alternately to pass with a green light the traffic which initiated the signal at the detector and stop with a red light the traffic on the cross streets. Thus, in Figure 14, if a vehicle on street B or D initiated the signal, green lights G_BD for those streets are illuminated with the corresponding red lights R_BD dark, while the red lights R_AC for the cross streets A and C are illuminated with the corresponding green lights G_AC dark, the cycle being subsequently reversed and continued in various ways, depending upon requirements. The circuits for lights R_AC and G_BD are controlled by switching device 52 through wire 55, and lights R_BD and G_AC are controlled through wire 56, being connected to line wire 53 by device 52 through relay 46, which is held closed by a holding circuit also controlled by device 52 in a conventional way or the like. The other terminals of the lights are connected to line wire 54. Any other suitable arrangement for controlling the signal 25 may be used with equal facility.

In the multiple detector system of Figure 13 the detector units are arranged in a line across the street or road in any desirable number, as is illustrated in Figure 1, and this is accomplished without requiring more than one control relay for each detector unit set, i. e. the five detector units 20 for through street A C of Figure 1, for example, as compared to the two detector units for the arrangement of Figure 14, the second of which is not shown but is connected in parallel with the detector unit 20 shown, in case both sides of a through street are intended to be protected. This arrangement accordingly differs from that of Figure 13 in which multiple detector units are employed, three (20C) for C street and two (20A) for A street, which is a continuation of C street.

It will be apparent that the three detector elements 20C in Figure 13 each produce flux extending appreciably beyond the ends of the respective detector elements. With this construction it is not necessary to depend on a single detector element for the operation of the signal control circuit. Accordingly, the present invention obviates the additional expense of extra detectors, multiple conductor cables, larger conduits and other apparatus which is not required in the present invention to permit proper operation of the signals for a street of a given width. The necessity of this additional expense is obviated in the present invention, as shown in Figure 13, because each control circuit is operable by any one of several detectors.

By arranging a plurality of the detectors of the present invention end to end across a road, as shown in Figures 1 and 13, a vehicle passing along the road between adjacent detectors may disturb the field of one of the detectors to produce 70%, for example, of the change necessary to secure operation of the detector relay, and 30% of the necessary change in the other of the adjacent detectors. The detector relay would then be actuated due to the cumulative effect of the disturbances of the magnetic fields.

Each of the primary windings 27 of detector units 20C and those of detector units 20A are connected in parallel between wires 57 and 58 connected to the opposite side of the 110-volt A. C. supply line. The secondary windings 28 of the detector units 20C are connected in series to the opposite terminals 59 of rectifier 60, while the secondary windings 28 of detector units 20A are connected in series to the opposite terminal 61 of rectifier 62. It has been found that each addition to the number of detector units 20 increases the voltage about one and one-half times that of a single detector, so that the resistance 63 in the secondary circuit of units 20A is increased to approximately 500 ohms with a proportional decrease in the capacity of condenser 64 to 2.50 microfarads as compared to the arrangement of Figure 14. Similarly, the resistance 65 of the secondary circuit for units 20C is increased to 1000 ohms with a decrease to 1.25 microfarads of the condenser 66.

Connected through the bridge-rectifier 60 with the secondary circuits of detector units 20C is the circuit of detector relay 67, while the circuit of detector relay 68 is connected through bridge-rectifier 62 with the secondary circuit of the detector units 20A.

The contactor 69 of detector relay 67 moves between contacts 71 and the contactor 70 of detector relay 68 moves between contacts 72, but both contactors 69 and 70 are normally disengaged from their contacts when the current in the circuit is at the predetermined initial value and move to engage either of them when the current is increased or decreased in the secondary circuit of the corresponding detector unit 20C or 20A in response to the presence of a vehicle in the sensitive field of the corresponding detector unit.

The contactors 69 and 70 are connected by wires 75 and 58 to one side of the 110-volt supply line and contacts 71 and 72 are connected by wires 76 and 77 through the coil 78 of control relay 79 to one contact 80 thereof, which is connected by wires 81 and 57 to one side of the 110-volt supply line. It is noted that only one control relay 78 is employed, which is energizable by either detector relay 67 or 68 for streets C and A, respectively.

A resistance 83 of the order of 1200 ohms and a condenser 84 of approximately .25 microfarad connected around the control relay coil 68 bypass a small leakage current around the latter to prevent freezing of the contactors 69 and 70 on the contacts 71 and 72 of the detector relays 67 and 68 respectively. This bypass also suppresses sparking at the detector relay contacts and the resistance 83 prevents too rapid charge and discharge of the condenser 84 during each frequency cycle, thus creating a lag in the current flow when it passes through zero, so that sparking is eliminated when the contacts of the detector relay 67 or 68 are broken. It is noted that the choke coil 47 and condenser 48 type of spark suppressor of Figure 14 will not function properly in the multiple detector relay arrangement of Figure 13, because it suppresses the desirable leakage current for preventing freezing of the contactors 69 and 70 of the detector relays 67 and 68. This arrangement enables the use of extremely sensitive contact-making devices, which cannot be used otherwise.

Condensers 89 and 90 connected across the primary circuits of detector units 20C and 20A, respectively, raise the power factor of the system from approximately 0.9 to unity, which creates a high current input for a comparatively low wattage. For example, for a detecting system of 28 watt capacity, the power factor correction necessary is approximately 64 microfarads.

The armature 85 bridges contacts 80 and 86 when the control relay 79 is energized in the manner described, so that the circuit is closed through wires 87 and 88 to a motor switching device 52' of conventional type for energizing traffic signals 25 in the manner previously described in connection with Figure 14.

By way of further illustration, the results of tests of the sensitivity show that a length of two-inch iron tubing four feet long placed parallel to the detector in a position similar to that of bar or axle 49 in Figures 2 and 12, developed a current change in the secondary circuit of the detector unit 20 equal to 34 mills when the bar was located one foot above the top surface of the detector unit 20. The same bar located transversely to the position illustrated in Figures 2 and 12, i. e., longitudinally of the street, developed a current change in the secondary circuit of the unit 20 equal to 36 mills when the bar was located one foot above the upper surface of the detector unit 20. When the bar was moved closer to the detector unit 20, the current decreased in the secondary for the position of Figure 2 and remained approximately the same for the longitudinal position just described, showing the sensitivity of the device during practical operation. Accordingly, the system is sensitive for any position of the vehicle axle or other permeable portion of the vehicle which is nearest to the surface of the road bed, and explains the reason for the ability of the system to be sensitive even when the detectors are arranged transversely across the street or road as indicated in Figure 1, so that they present their narrowest portion to the vehicle traveling in the usual direction along the road toward the intersection.

While the system of this invention has been illustrated as applied to typical traffic installations, it is to be understood that it may be used in practically every conceivable signal system or devices of various kinds for signalling, and that various refinements and improvements of this invention are not necessarily limited to traffic control systems and apparatus, but are applicable in other fields within the scope of this invention. For example, the new detector system can be employed for detecting and signalling the passage of vessels, signalling the registration of vessels at docks or piers or of air craft when landing, location of ore bodies and buried magnetic and inductive masses, and for any other purpose where magnetic or inductive detection can be employed.

I claim:

1. A traffic control signal, electrically operated controlling means therefor, a vehicle responsive element comprising two adjacent and substantially parallel magnetic cores, primary and secondary windings for providing flux leakage linking each secondary winding to both primary windings in substantially equal and opposite relationship and alterable by proximity of a vehicle to said cores, means for energizing said primary windings to produce magnetomotive forces in the same direction from each core, a capacitor substantially resonating the secondary windings, a device connected to said secondary windings and responsive to current changes therein, and means connecting said current responsive device to said controlling means whereby alteration of said leakage flux by a vehicle causes said controlling means to actuate the signal.

2. Apparatus for detecting traffic along a lane, comprising a plurality of magnetic devices, each having a pair of cores arranged side by side, with their ends in spaced relation, each end of each core being arranged substantially closer to the adjacent end of the other core than to the other end of the same core, a pair of primary coils arranged respectively on one end portion of one core and the other end portion of the other core, a pair of secondary coils arranged respectively on the other end portion of said cores, said primary coils when connected to an alternating current source generating a normal flux flow through said cores to induce a current in the circuit of said secondary coils, said devices being adjacently spaced with respect to each other in said lane whereby a single vehicle entering the flux passing between two adjacent devices affects the flux thereof, and means connecting all of the secondary coils in series whereby the presence of a vehicle changing the normal flow of flux is cumulative in said secondary coils.

3. In an electromagnetic device for detecting vehicles, the combination of a plurality of transformers arranged substantially end to end in a set in the path of traffic in a road, means connecting the primary windings of the transformers of the set in parallel, means for energizing the primary windings of said transformers to produce an alternating magnetic field in the space adjacent to each transformer, the adjacent ends of adjacent transformers cooperating to provide flux distribution alterable by an electrically conductive vehicle entering therein, means connected to the secondary windings of said transformer set and responsive to the change in current intensity therein produced by the presence of an electrically conductive vehicle in said flux distribution between said adjacent transformer ends, and means cooperating with said last named means and capable of controlling the operation of electrically actuable apparatus.

4. In a device for detecting the presence of electrically conductive vehicles upon a roadway, a substantially bar-shaped magnetic core, a coil upon said core, a source of alternating current connected to generate alternating magnetic flux in said core and coil and emanating therefrom, electrically conductive flux diverting means disposed in proximity to said core and shaped to urge said flux laterally toward one side of the longitudinal axis of said core, and means responsive to the alteration of said flux caused by the entrance into the path thereof of a vehicle having electrically conductive parts.

5. In a device for the detection of vehicles having ferromagnetic parts, a plurality of substantially parallel and bar-shaped magnetic cores, paths for magnetic flux linking said cores jointly, paths for magnetic flux linking said cores individually, coils disposed upon said cores, conductors interconnecting said coils in cumulative electrical relationship with respect to both said joint and said individual flux paths, and electrically actuable means connected to said conductors and responsive to the changed conditions in either said joint or said individual or both said classes of flux paths caused by the entrance into said paths of a vehicle having ferromagnetic parts.

6. In a device for the detection of vehicles, a plurality of coils disposed with their axis in substantially parallel relationship, paths of magnetic flux linking said coils both jointly and severally, conductors interconnecting said coils in cumulative electrical relationship with respect to both said joint and said several flux paths, and electrically actuable means responsive to the alteration in either said joint or said several or both said classes of flux paths caused by the entrance into said paths of a vehicle having ferromagnetic parts.

7. In a device for the detection of the presence of a vehicle upon a roadway, in combination: a magnetic core located beneath the surface of said roadway, a coil disposed upon said core, paths of magnetic flux linking said coil and extending above said roadway, electrically conductive flux diverting means disposed in proximity to said coil and shaped to urge said flux paths above said roadway, and electrically actuable means responsive to the alteration in said flux paths caused by entrance into said paths of a vehicle having ferromagnetic parts.

8. In a device for the detection of vehicles passing over a roadway, a plurality of coils disposed in substantially coaxial relationship, flux paths linking said coils both jointly and severally, conductors interconnecting said coils in cumulative electrical relationship with respect to both said joint and said several flux paths, and electrically responsive means actuable by the alteration in said joint and said several and both said classes of flux paths by the passage therethrough of a vehicle having ferromagnetic parts.

9. In a device for the detection of vehicles having ferromagnetic parts, a plurality of magnetic cores spaced in adjacent relationship, paths for magnetic flux linking adjacent ends of adjacent cores and extending into the space intermediate and surrounding said adjacent ends, coils disposed upon said cores and linked by magnetic flux therein, conductors interconnecting said coils in cumulative electrical relationship, and electrically actuable means connected to said conductors and responsive to changes in voltage induced in said coils caused by the entrance into said flux paths of a vehicle having ferromagnetic parts.

10. In a device for the detection of vehicles having ferromagnetic parts, a magnetic core, a coil upon said core, paths for magnetic flux extending into the path of said vehicles and linking said coil and said core, electrically actuable means connected to said coil and responsive to changes in magnetic conditions in said flux paths resulting from the passage therethrough of a vehicle having ferromagnetic parts, and electrically conductive flux diverting means disposed in proximity to said core and shaped to urge changing magnetic flux in said paths into closer proximity to said vehicles.

11. In a device for the detection of vehicles, the combination of a plurality of magnetic core transformers arranged substantially end to end in a set, means for energizing the primary windings of said transformers to produce an alternating magnetic field, conductive members secured to said transformers and shaped to divert said field toward said vehicles, adjacent ends of adjacent transformers cooperating with said conductive members to provide flux distribution extending into the space surrounding said adjacent transformer ends, and electrically actuable means connected to the secondary windings of said transformers and responsive to the alteration in said flux distribution caused by the presence therein of a permeable metal-containing vehicle.

12. In an apparatus for detecting vehicles, the combination of a plurality of transformers arranged substantially end to end in a set in the path of traffic in a road, means connecting the primary windings of the transformers of the set in parallel, means for energizing the primary windings of said transformers to develop a magnetic field adjacent each transformer, the adjacent ends of adjacent transformers cooperating to provide flux distribution alterable by a vehicle entering therein, electrically conductive flux diverting means disposed in proximity to said transformers and shaped to urge said flux toward traffic in said traffic path, a detector relay for the set of transformers connected to the secondary windings thereof and responsive to a change in the current induced in the secondary windings of the transformers of said set by disturbing the magnetic field of adjacent transformers by the presence of a permeable metal-containing vehicle therein, and a control relay actuated by said detector relay.

13. In an apparatus for detecting vehicles, the combination of a plurality of transformers arranged in a set substantially end to end, means connecting the secondary windings of the transformers of said set in series, means for energizing the primary windings of said transformers to develop an alternating magnetic field, conductive shielding means on said transformer for directing said magnetic field in a path passing above the surface of the road over and extending beyond each transformer, the adjacent ends of adjacent transformers cooperating with said shielding means to provide flux distribution alterable by a vehicle entering therein, a detector relay for said set of transformers connected to the secondary windings thereof and responsive to the cumulative change in the voltage induced in the secondary windings of adjacent transformers by the presence of a permeable metal-containing vehicle in said flux distribution, and a control relay actuable by said detector relay.

14. In an apparatus for detecting vehicles, the combination of a plurality of transformers arranged in a set substantially end to end, means connecting the primary windings of the transformers of said set in parallel, means connecting the secondary windings of the transformers of said set in series, means for energizing the primary windings of said transformers to develop an alternating magnetic field, shielding means on said transformer disposed beneath and beside the cores thereof for directing said magnetic field in a path above the surface of the road over and extending beyond each transformer, the adjacent ends of adjacent transformers cooperating with the shielding means to provide flux distribution alterable by a vehicle entering therein, a detector relay for said set of transformers connected to the secondary windings thereof and responsive to the cumulative change in the current induced in the secondary windings of the transformers of said set by the presence of a permeable metal-containing vehicle in the magnetic fields of adjacent transformers, and a control relay actuable by said detector relay.

15. In a device for the detection of vehicles having electrically conductive parts, a magnetic core, a coil upon said core, paths for magnetic flux extending into the path of said vehicles and linking said coil and said core, electrically actuable means connected to said coil and responsive to changes in magnetic conditions in said flux paths resulting from eddy currents induced in an electrically conductive vehicle entering said flux paths, and electrically conductive flux diverting means disposed in proximity to said core and shaped to urge changing magnetic flux in said paths into closer proximity to said vehicles.

16. In a device for detection of the proximity of a vehicle, an electromagnetic unit comprising two substantially bar-shaped and parallel adjacent magnetic cores, primary and secondary windings upon said cores, means for energizing said primary windings to produce an alternating magnetic field extending lengthwise of one core and substantially to the center thereof and extending across the space intermediate the central portions of both said cores to the other core and thence along said other core and in the same sense throughout the remaining length thereof, said field extending into the space surrounding said unit, leakage fields from said first named field linking said secondary windings in substantially equal and opposite relationship, conductors connecting said secondary windings in cumulative electrical relationship with respect to variations in said leakage fields attending the alteration of said first named field resulting from the presence in said first named field of a permeable metal-containing vehicle, a capacitor serially connected in said conductors and approximately resonating said secondary windings, and electrically responsive means connected to said conductors and actuable by current changes in said secondary windings resulting from said alteration of said first named field.

PAUL PETER HORNI.